United States Patent [19]

Sadlo

[11] 3,991,002
[45] Nov. 9, 1976

[54] PRIMER FOR OILY SURFACES
[75] Inventor: James L. Sadlo, Lauderdale, Minn.
[73] Assignee: Minnesota Mining and Manufacturing Company, St. Paul, Minn.
[22] Filed: Feb. 21, 1975
[21] Appl. No.: 551,611

[52] U.S. Cl. .......................... 260/32.8 A; 156/307; 156/308; 156/334; 260/27 BB; 260/876 B; 260/880 B; 427/385 R; 428/500
[51] Int. Cl.² ................ C08K 5/07; C08L 53/02
[58] Field of Search ....... 260/27 BB, 876 B, 32.8 A, 260/880 B

[56] References Cited
UNITED STATES PATENTS

| | | | |
|---|---|---|---|
| 3,239,478 | 3/1966 | Harlan | 260/876 B |
| 3,630,980 | 12/1971 | Russell | 260/876 B |
| 3,658,740 | 4/1972 | Marrs et al. | 260/880 B |
| 3,676,386 | 7/1972 | Brenner et al. | 260/32.8 A |
| 3,753,936 | 8/1973 | Marrs | 260/880 B |
| 3,792,005 | 2/1974 | Harlan | 260/32.8 A |

OTHER PUBLICATIONS

Haws et al., Rubber World 167, (Jan. 1973), pp. 27–30, 32 & 48.

Primary Examiner—Donald E. Czaja
Assistant Examiner—H. H. Fletcher
Attorney, Agent, or Firm—Alexander, Sell, Steldt & Delahunt

[57] ABSTRACT

Oily or other difficultly adherable surfaces are rendered receptive to pressure-sensitive adhesives when sprayed or coated with an organic solvent solution or dispersion of certain rubbery block copolymers and an unusually large amount of thermoplastic resin, preferably a blend in which at least one resin is compatible with each block of the copolymer.

12 Claims, No Drawings

PRIMER FOR OILY SURFACES

BACKGROUND OF THE INVENTION

This invention relates to a method of rendering oily and other difficultly adherable surfaces receptive to pressure-sensitive adhesives and to a primer having particular utility for that function.

In many fields of industry there are occasions when it is desired to apply a pressure-sensitive adhesive-coated sheet material to a greasy or oily surface. For example, filament tape is sometimes used to bind pipes together to facilitate handling; since such pipes are often coated with oil during manufacture or storage, it is difficult to obtain a firm bond with the tape. In other instances, it is desired to adhere anti-slip sheet material to the floor surfaces around a lathe or other piece of machine shop equipment, where the floor is frequently slippery because of the presence of oil. Lane marking tape is often adhered to factory floors to define areas and indicate passageways, and many factory floors are contaminated by the presence of oil.

In all instances where a normally tacky and pressure-sensitive adhesive tape is applied over an oily surface, the oil tends to prevent the adhesive from forming an intimate contact with the substrate. Even where extreme pressure is applied to promote such contact, the oil tends to plasticize the adhesive and render it more or less ineffective. It is, of course, essential that the adhesive establish and maintain intimate contact with the substrate, since a bundling tape which slips or a nonslip floor marking which comes loose may generate a misplaced confidence and hence be worse than none.

Recognizing the problem of obtaining adhesion to oily substrates, the prior art has resorted to such techniques as scrubbing the contaminated surface vigorously with a steel brush, washing with solvent, or both. Such techniques, while effective to a degree, are tedious, time-consuming and expensive. The present invention provides a unique, simple, and inexpensive alternative.

SUMMARY

The present invention provides a means for obtaining excellent adhesion of normally tacky and pressure-sensitive adhesive-coated products to oily and greasy substrates, greatly enhancing the bonding power of the adhesive thereto, both initially and after extended periods of contact. The invention eliminates the need for the tedious and expensive cleaning methods which were previously thought to be essential and thus widens the field of potential application for a variety of pressure-sensitive adhesive-coated sheet materials.

In addition, the present invention provides a means for enhancing the adhesion of pressure-sensitive adhesive tape and related products to such other difficultly adherable surfaces as green, pitch-covered or creosoted wood, uncured concrete, and cinder blocks.

In one aspect, the invention involves applying to an oily substrate an organic solvent solution or dispersion of certain rubbery block copolymers and a blend of resins, at least one of which is compatible with each of the blocks in the copolymer. While rubber:resin blends and solutions thereof (including blends of block copolymers and a plurality of thermoplastic resins) are broadly old, having previously found utility in the manufacture of normally tacky and pressure-sensitive adhesives, the present invention distinguishes over such prior art by employing an extremely high resin:rubber ratio, on the order of 85:15 - 65:35. Neither the block copolymers themselves nor the resins blended therewith are new, the invention residing in a fortuitous combination.

The rubbery copolymers which are employed have the general configuration A-B-A, wherein each A is a thermoplastic polymer block having a glass transition temperature above 20° C. and relatively incompatible with the B block, the average molecular weight of each A block being between about 5,000 and 125,000; a preferred embodiment of the invention employs polystyrene for the A blocks. B is an elastomeric polymer block formed from a conjugated diene, the average molecular weight of the B block being between about 15,000 and 250,000 and the total weight of the B blocks constituting more than about 20% of the weight of the rubbery copolymer. Preferred embodiments of the invention employ polybutadiene or polyisoprene for the B blocks. Further details about such copolymers, adhesive compositions formed therewith, and methods of preparing them are set forth in U.S. Pat. No. 3,239,478, the pertinent disclosures of which are incorporated herein by reference.

A particularly preferred rubbery block copolymer for use in practicing the invention is a radial teleblock copolymer consisting of several polystyrene-terminated elastomeric branches formed from a conjugated diene and extending from a central hub.

In block copolymers of the type described above, the polydiene and polystyrene portions are incompatible and form a two-phase system consisting of sub-micron sized "domains" of glassy polystyrene interconnected by flexible polydiene chains. These "domains" serve to crosslink and reinforce the structure, giving rise to an elastomeric network which behaves as though it were filled and chemically crosslinked. This network structure, in contrast with that of chemically crosslinked rubbers, is reversible, and either heating the polymer above the softening point of polystyrene or dissolving it in a suitable solvent temporarily disrupts the structure, which can be restored by either lowering the temperature or evaporating the solvent.

It has previously been recognized that in block copolymers of polystyrene and a polymer formed from a conjugated diene, it may be desirable to prepare adhesives by employing a first thermoplastic resin which is compatible with polystyrene and a second thermoplastic resin which is compatible with the polydiene. While the present invention employs compositions falling in this broad category, the resin: copolymer weight ratio far exceeds any previously employed in the preparation of adhesive compositions, as a result of which a solution formed of the composition possesses the ability to function as a primer composition for rendering oily and greasy surfaces capable of establishing firm bonds with normally tacky and pressure-sensitive adhesives.

Solutions prepared in accordance with the invention are used to prime oily surfaces so as to render them receptive to normally tacky and pressure-sensitive adhesive compositions by simply applying the solution to the oily substrate and allowing the solvent to evaporate. Thereafter, normally tacky and pressure-sensitive adhesive tape applied to the primed surface requires a force of at least 900 (preferably at least 1300) grams per centimeter of width for removal.

In a particularly preferred embodiment of the invention, the solution is provided in a pressurized aerosol-type container, thereby facilitating application.

PRESENTLY PREFERRED EMBODIMENTS OF THE INVENTION

As used throughout all subsequent discussions herein, all parts and percentages are by weight unless otherwise noted.

Priming Effectiveness Test.

In order to evaluate the effectiveness of the priming compositions of the invention, it has been found desirable to employ a test which simulates field conditions. In this test, tin-plated steel panels approximately 0.3 mm thick and 16.5 × 25.4 centimeters in area are coated on one side with 0.25 gram ± 0.02 gram of a viscous mineral base oil, similar to that employed in vacuum pumps. A sample formulation to be tested is then applied to the panel by brushing it on over a 5-centimeter wide path extending the entire length of the panel, so as to leave, after evaporation of the solvent, a primer coating of 0.25 gram ± 0.06 gram. The solvent is allowed to evaporate over a 1½-hour period, after which a 12.7-mm wide strip of testing tape is applied to the primed surface, extending along the primed path. A light weight roller (approximately 400 grams) is used to roll down the tape sample, which is then allowed to remain in place for two hours. The tape is then removed from the test panel by doubling one end back on itself and pulling it so that it extends over the opposite end of the panel. The exposed end of the panel is then clamped in the upper jaws of a tensile testing machine and the free end of the tape grasped in the opposite jaws, the jaws then being separated at a rate of approximately 25 centimeters per minute while measuring the force required to strip away the tape. The priming composition is deemed successful if the force required to remove the tape is at least about 1100 grams, or approximately 900 grams per centimeter of width.

Because it is desirable for a primer to function effectively with a wide variety of normally tacky and pressure-sensitive adhesive tapes, the foregoing test is preferably run with two test tapes having distinctly different rubber-resin pressure-sensitive adhesives, priming being deemed adequate if satisfactory adhesion of at least one tape is achieved. These tapes, hereinafter identified as A and B, may be characterized as follows:

Tape A

A high adhesion tape having the ability to form firm bonds quickly. The backing is a smooth paper, having a basis weight of 32 lbs per papermaker's ream (53 g/m²), saturated with a rubber-resin blend. The pressure-sensitive adhesive is formed by compounding 100 parts of natural rubber, 52 parts of heat treated wood rosin, 27 parts of gum rosin, 3 parts calcium hydroxide and 0.95 part di-pentamethylene thiuram tetrasulfide. This tape is commercially available from Minnesota Mining and Manufacturing Company under the trade designation "No. 254".

Tape B

A moderately high adhesion tape having a firm adhesive. The backing is 1.4-mil (35-micron) cellophane, and the adhesive is a "bakelized" rubber-resin formed by compounding 100 parts of rubbery butadiene:styrene copolymer, 60 parts esterified gum rosin, 40 parts coumarone-indene resin, 12 parts phenol-formaldehyde resin, and extenders, stabilizers, pigments, etc. as desired.

For convenience, suitable components for preparing effective primer compositions in accordance with the invention will now be indicated.

Rubbery Block Copolymer.

The following styrene: butadiene block copolymers have been found satisfactory: styrene:butadiene:styrene rubbers having a styrene:rubber ratio of approximately 15:85 to 30:70; styrene:isoprene-styrene copolymers having a styrene:rubber ratio of 14:86 and a solution viscosity of 1600 cps; and styrene:butadiene radial teleblock copolymers having a styrene:butadiene ratio of 30:70 and an inherent viscosity in tetrahydrofuran of 1.50.

While it is essential for purposes of this invention that the primer composition contain a rubbery block copolymer of the type previously described, it is possible to extend the composition by adding minor amounts of other types of rubbery materials, e.g., random butadiene:acrylonitrile copolymers, random butadiene:styrene copolymers, crude rubber, polyisoprene, etc. Speaking in general terms, these rubbery materials tend to reduce the effectiveness of the primer composition. They should be included, if at all, in limited quantities.

Thermoplastic resins which are compatible with polystyrene and suitable for the practice of this invention includes hydrocarbon resins, such as those available under the trademark "Picco" 6000 from Hercules Incorporated and Neville LX-685 from the Neville Chemical Company; coumarone-indene resins, such as those available under the trademark "Cumar" LX-509 or R-16 and "Nevindene" from the Neville Chemical Company; polyalphamethyl styrene, such as the Amoco 18 series available from the Amoco Chemical Company; polyalphamethyl styrene:vinyl toluene copolymers, such as those available under the trademark "Piccotex" from Hercules Incorporated; polystyrene, such as that available under the trademark "Piccolastic" from Hercules Incorporated; dimerized rosin, such as that available under the trademark "Dymerex" from Hercules Incorporated; metal resinates, such as that available under the trademark "Pexate" 329 from Hercules Incorporated; phenolic resin, such as Schenectady SP-154, available from Schenectady Chemicals Incorporated; copolymers of piperylene, such as that available under the trademark "Quintone" U-85 from Nippon Zeon of America, Inc.; etc.

Thermoplastic resins which are compatible with synthetic rubbers of the type described and suitable for the practice of the invention include a wide variety of polymerized mixed olefins, such as those available under the trademarks "Wing Tack" from Goodyear; "Super Sta-Tac", "Sta-Tac", "Sta-Tac" D, "Sta-Tac" R, "Betaprene" BC, AC, or H-100 from Reichhold Chemicals corporation, "Piccopale" HM-200 or "PiccoTac" B from Hercules Incorporated, "CRJ-683" from Schenectady Chemicals Incorporated, and "Easto-Rez" from Eastman Chemicals; glycerol esters of hydrogenated rosin such as that available under the trademark "Staybelite" Ester 10 from Hercules Incorporated; pentaerythritol esters of hydrogenated rosin such as that available as "Pentalyn" H from Hercules Incorporated; glycerol esters of highly stabilized rosin, such as that available under the trademark "Foral" 85 from Hercules Incorporated; pentaerythritol esters of highly stabilized rosin, such as that available under the trademark "Foral" 105 from Hercules Incorporated; polyterpene resins such as those available under the trademark "Zonarez" 7000 series from Arizona Chemical Company or "Nirez" 1085 available from Reichhold Chemicals Corporation; terpenephenolic resins, such as that available under the trademark "Picco" LTP-100 from Hercules Incorporated; heat treated wood rosins, such as that available under the trademark "Tenex" from Reichhold Chemicals Corporation; highly stable cycloaliphatic hydrocarbon resins, such as that available under the trademark "Permalyn" XA from Hercules Incorporated; synthetic terpene polymers, such as those available under the trademark "Piccolyte" from Hercules Incorporated; tall oil resins, such as those available under the trademark "Acintol" R from Arizona Chemical Company; etc.

As used herein, the term "compatible" is intended to refer to those resins which are structurally sufficiently similar to the block referred to that a solution containing a solute formed solely of equal parts the resin and block material will dry to a transparent film.

The solvents used in preparing compositions of the invention preferably constitute a blend of organic solvents, including at least some aromatic solvent. Where, for example, the primer solution is to be applied by roller-coating, brushing, etc., a suitable combination of solvents includes 60% ketones (e.g., 30% each of acetone and methyl ethyl ketone), 30% heptane, and 10% toluene. For such applications, the solvent may constitute about ⅔ the total weight of the solution.

Where primer compositions of the invention are to be applied from aerosol containers, the percent solids of the solution is typically somewhat lower than in the case of solutions applied from bulk, a solution containing 20–30% solids having been found quite satisfactory. Aerosol packages must include as propellant low molecular weight compound which boils below 25° C. In compositions to be dispensed from an aerosol package, it is preferred to employ as solvent a blend of about 5% toluene and 95% of such halocarbons as trichloroethylene, methylene chloride, chloroform and the like. Such chlorocarbons are especially desirable, since they perform the additional functions of solubilizing oil or grease and helping maintain the rubbery copolymer in solution. A blend of low molecular weight aliphatic hydrocarbons (e.g., a 30:70 propane:isobutane) is effective as a propellant.

In addition to the components previously described for incorporation in the primer compositions of the invention, it may also be desirable to include various other components. It has been found, for example, that it is desirable to include a minor but effective amount of an anti-oxidant such as symmetrical dibeta-naphthol-p-phenylene diamine or polymerized 1,2-dihydro-2,2,4-trimethyl quinoline, respectively available under the trademark "AgeRite" White and "AgeRite" Resin D from R. T. Vanderbilt Company; 1,3,5-trimethyl-2,4,6-tris(3,5-di tert-butyl-4-hydroxybenzyl) benzene, available as Anti-Oxidant 330 from Ethyl Corporation; modified hindered phenols such as those available under the trademark "Vanox" 13 from R. T. Vanderbilt; tetra-bis-methylene-3(3′,5′-tert-butyl-4′-hydroxy phenyl propionate) methane and octadecyl-beta-(3,5-tert-butyl-4-hydroxy phenyl) propionate, respectively available under the trademarks "Irganox" 1010 and "Irganox" 1076 from Geigy Industrial Chemicals; 2,2′-methylene-bis(4-methyl-6-tert-butyl phenol), available as Anti-Oxidant 2246 from American Cyanamide; stearyl thiodipropionate, available under the trademark "Plastanox" STDP from American Cyanamid; etc.

As a further aid to understanding the invention, a series of tabulated examples will be set forth below. In each of these examples, the components described were blended, together with approximately 0.4% 1,3,5-trimethyl-2,4,6-tris(3,5-di tert-butyl-4-hydroxy benzyl) benzene anti-oxidant (based on the amount of rubbery copolymer present) and sufficient solvent to reduce the solids content to approximately 20%. Test procedures were as described previously.

In the table, the following abbreviations are used in the interest of simplicity:

Rubbery copolymers

K 1101 — 70:30 butadiene:styrene block copolymer, having a solution viscosity (25% in toluene, 23° C.) of 4,000 cps, commercially available from Shell Chemical Co. as "Kraton" 1101.

K 1107 — 86:14 isoprene:styrene block copolymer, having a solution viscosity (25% in toluene, 23° C.) of 1,600 cps, commercially available from Shell Chemical Co. as "Kraton" 1107

S 411 — 70:30 butadiene:styrene radial teleblock copolymer, commercially available from Phillips Petroleum Company as "Solprene" 411

Polystyrene-compatible resins

A-135 — Alpha-pinene available from Hercules Incorporated as "Piccolyte" A-135

S-115 — synthetic terpene polymer having a ball and ring softening point of 115° C., commercially available from Hercules Incorporated as "Piccolyte" S-115

T — X-grade wood rosin, commercially available from Reichhold Chemicals Corporation as "Tenex"

U-85 — piperylene copolymer having a softening point of 85° C., commercially available from Nippon Zeon of America, Inc. as "Quintone" U-85

WT 95 — polymerized mixed olefins, having a softening point of approximately 95° C., commercially available from Goodyear Tire & Rubber Company as "Wing-Tack" 95.

XA-125 — highly stable cycloaliphatic hydrocarbon resin, having a ring and ball softening point of 130° C., commercially available from Hercules Incorporated as "Permalyn" XA-125

Polydiene-compatible resins

EG — Rosin ester available from Reichhold Chemicals Corporation as "P.E. Ester Gum"

F85 — highly stabilized ester rosin, having a softening point of about 80° C., an acid number of 9, and a specific gravity of 1.07, commercially available from Hercules Incorporated as "Foral" 85

H — rosin ester having a softening point of 104° C., commercially available from Hercules Incorporated as "Pentalyn" H N — gum rosin available from Glidder Company as "Nelio" N T — X-grade wood rosin, available from Reichhold Chemicals Corporation as "Tenex"

It will be noted that some resins are compatible with both polystyrene and polydienes, apparently associating with the block for which the other resin present has the less affinity.

TABLE I

| Example | Solvent Type | Solvent Amount | Rubbery Copolymer Type | Rubbery Copolymer Wt. | Polystyrene-compatible resin Type | Polystyrene-compatible resin Wt. | Polydiene-compatible resin Type | Polydiene-compatible resin Wt. | Adhesion, gms/cm Tape 1 | Adhesion, gms/cm Tape 2 |
|---|---|---|---|---|---|---|---|---|---|---|
| 1 | CHCl₂ toluene | 1380 70 | K1101 | 100 | XA-125 | 94 | F | 85 240 | — | 1160 |
| 2 | CHCl₂ toluene | 1380 70 | S 411 | " | " | " | " | " | 1150 | 1720 |
| 3 | CHCl₂ toluene | 1380 70 | " | " | " | 137 | " | " | | |
| 4 | CHCl₂ toluene | 1380 70 | " | " | " | 166 | " | 430 | 1070 | 1650 |
| 5 | CHCl₂ toluene | 1380 70 | " | " | " | 180 | " | 180 | 1430 | 1790 |
| 6 | ethyl acetate | 1450 | " | " | A-135 | 254 | N | 109 | 1070 | 1400 |
| 7 | methyl ethylketone | 1450 | " | " | U-85 | 109 | " | 254 | 1400 | 1500 |
| 8 | toluene | 1450 | " | " | S-115 | 254 | H | 109 | 1580 | 1150 |
| 9 | toluene | 1450 | " | " | " | | H N | 127 109 | 1400 | 1400 |
| 9 | heptane | 1450 | K1107 | " | " | 254 | EG | 109 | 600 | 820 |
| 10 | toluene | 1450 | " | " | " | 109 | N | 244 | 1470 | 1520 |
| 11 | heptane | 1450 | " | " | T | " | " | " | 880 | 1040 |
| 12 | toluene | 1450 | " | " | WT 95 | " | T | " | 970 | 1520 |

I claim:

1. A primer composition for rendering oily and greasy surfaces capable of establishing firm bonds with normally tacky and pressure-sensitive adhesives, comprising in combination an organic solvent solution or stable dispersion of a rubber-resin blend, the solids thereof consisting essentially of, on a weight basis,
   a. 15–35 parts of rubbery polymer consisting essentially of rubbery block copolymer selected from the class consisting of
      1. rubbery block copolymer having the general configuration A-B-A wherein
         a. each A is a thermoplastic polymer block which has a glass transition temperature above 20° C., which is relatively incompatible with the B block and which has an average molecular weight between about 5,000 and 125,000;
         b. is an elastomeric polymer block of a conjugated diene, having an average molecular weight between about 15,000 and 250,000;
         c. the total weight of the A block is less than about 80% of the weight of the block copolymer, and
      2. radial teleblock copolymer consisting of several polystyrene-terminated elastomeric branches, each of said branches being a homopolymer of a conjugated diene extending from a central hub; and
   b. correspondingly 85–65 parts of resinous components,
      1. about 15–85% of said resinous components, being characterized by compatibility with a homopolymer formed from said conjugated diene
      2. the balance of said resinous components being characterized by compatibility with polystyrene.

2. The composition of claim 1 wherein about 30–75% of the resinous components are characterized by compatibility with a homopolymer formed from said conjugated diene.

3. In an organic solvent solution or dispersion of a rubbery block copolymer selected from the class consisting of
   1. rubbery block copolymer having the general configuration A-B-A wherein
      a. Each A is polystyrene having a molecular weight between about 5,000 and 125,000;
      b. B is a monopolymer of butadiene or isoprene, having an average molecular weight between about 15,000 and 250,000; and
      c. the total weight of the A blocks is less than about 80% of the weight of the block copolymer, and
   2. radial teleblock copolymer consisting of several polystyrene-terminated elastomeric branches, each of said branches being a homopolymer of a conjugated diene from a central hub, a first thermoplastic resin compatible with polystyrene and a second thermoplastic resin compatible with said homopolymer,
   the improvement which comprises a resin: copolymer weight ratio in the ragne of 85:15 – 64:35, whereby said solution possesses the ability to function as a primer composition for rendering oily and greasy surfaces capable of establishing firm bonds with normally tacky and pressure-sensitive adhesives.

4. The composition of claim 3 wherein the first resin:second resin weight ratio is in the range of 85:15 to 15:85.

5. The composition of claim 4 wherein an effective amount of anti-oxidant is present.

6. The composition of claim 5 wherein said B is polybutadiene.

7. The composition of claim 6 wherein the organic solvent constitutes about ⅔ the weight of the solution, about 10% of the solvent being toluene, the balance of the solvent consisting essentially of approximately equal weights of methyl ethyl ketone, acetone and heptane; the solids portion consisting essentially of about 20–25% of a butadiene:styrene radial teleblock copolymer, 55–60% stabilized ester resin, about 20–25% cycloaliphatic petroleum hydrocarbon resin and about 0.2 – 0.5% anti-oxidant; all percentages being taken on a weight basis.

8. The composition of claim 5 wherein said B is polyisoprene.

9. The composition of claim 4 wherein the solution is packaged in an aerosol container, together with propellants selected from the class consisting of low molecular weight hydrocarbon and halogenated hydrocarbon having a boiling point below about 25° C., to facilitate application.

10. The composition of claim 9 wherein the solvent comprises toluene, the propellant comprises aliphatic hydrocarbons, and methylene chloride is present, functioning as both solvent and propellant.

11. The composition of claim 9 wherein the solids present constitute about 20% of the weight of the composition, and the balance is made up of organic solvents and propellants; said solids including an effective amount of anti-oxidant and consisting essentially of about 20% of butadiene:styrene radial teleblock copolymer, about 50% stabilized ester resin, about 30% cycloaliphatic petroleum hydrocarbon resin; said balance consisting essentially of about 5% toluene, about 65% dichloromethane, about 5% propane, and about 25% isobutane.

12. The method of priming an oily surface to which tacky and pressure-sensitive adhesives do not normally bond firmly comprising applying to said surface the composition of claim 1 and allowing the solvent to evaporate, whereby normally tacky and pressure-sensitive adhesive tape applied to the prime surface requires a force of at least 900 grams per centimeter of width for removal.

* * * * *